R. T. PARK.
MACHINE FOR EXTRACTING THE JUICE AND PULP FROM LEMONS AND THE LIKE.
APPLICATION FILED APR. 21, 1914.
1,107,991.
Patented Aug. 18, 1914.
2 SHEETS—SHEET 1.
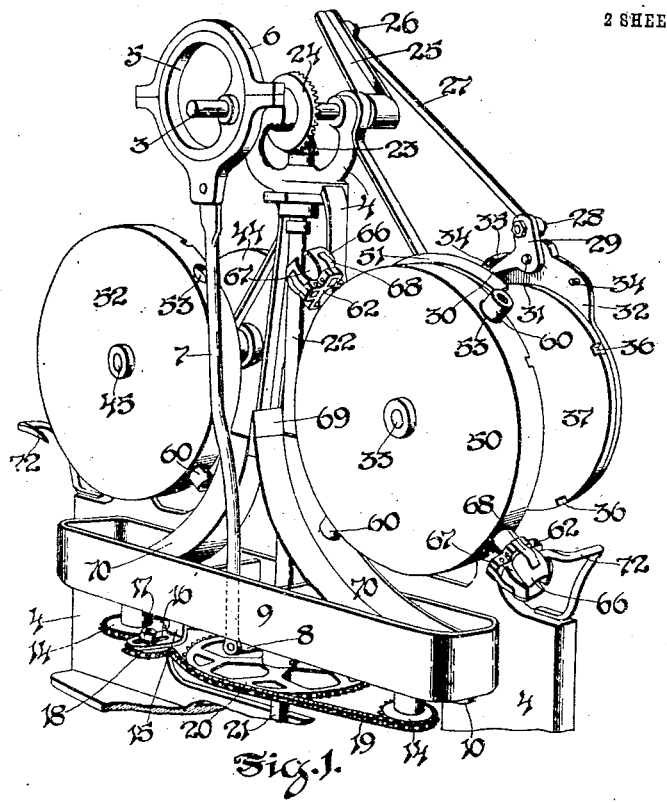
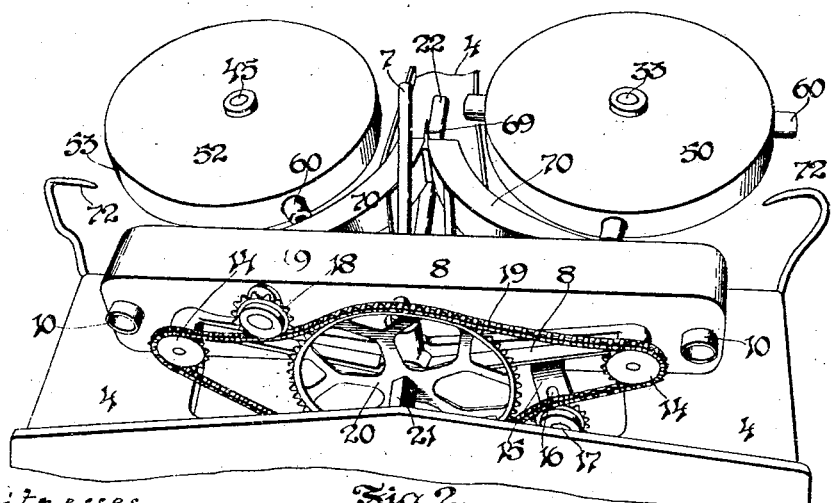

R. T. PARK.
MACHINE FOR EXTRACTING THE JUICE AND PULP FROM LEMONS AND THE LIKE.
APPLICATION FILED APR. 21, 1914.
1,107,991.
Patented Aug. 18, 1914.
2 SHEETS—SHEET 2.
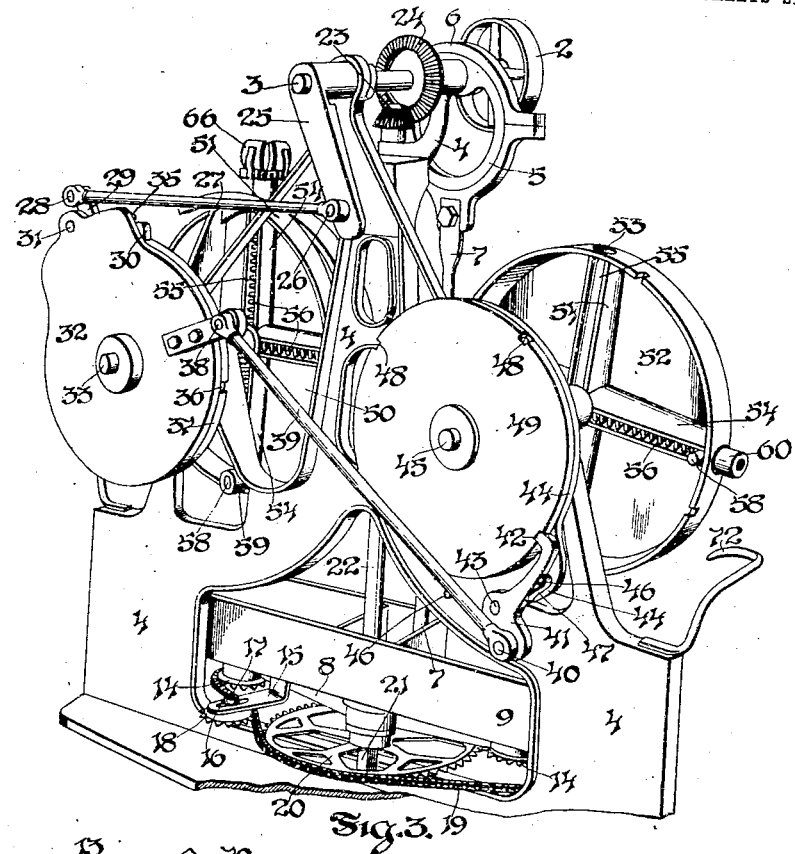
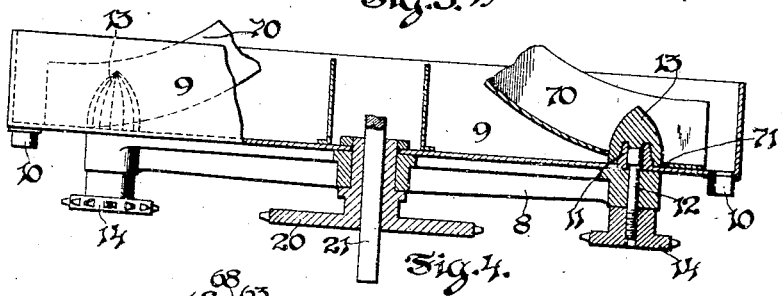
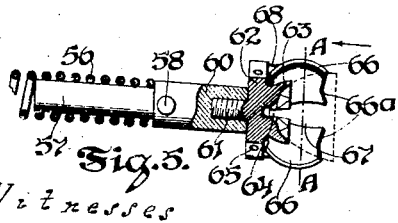
Witnesses
Bernadine M. Ferriter.
W. Wallace Nairn Jr
Inventor.
Richard T. Park
By Dowell & Dowell
Attorneys

UNITED STATES PATENT OFFICE.

RICHARD THOMAS PARK, OF ALBERT PARK, MELBOURNE, VICTORIA, AUSTRALIA.

MACHINE FOR EXTRACTING THE JUICE AND PULP FROM LEMONS AND THE LIKE.

1,107,991.  Specification of Letters Patent.  Patented Aug. 18, 1914.

Application filed April 21, 1914.  Serial No. 833,406.

*To all whom it may concern:*

Be it known that I, RICHARD THOMAS PARK, a subject of the King of Great Britain and Ireland, and a resident of the post-town of Albert Park, a district of the city of South Melbourne, a suburb of the city of Melbourne, in the county of Bourke, State of Victoria, Commonwealth of Australia, (whose post-office address is 49 Moubray street, in the said post-town of Albert Park,) have invented a certain new and useful Improved Machine for Extracting the Juice and Pulp from Lemons and the like, of which the following is a specification.

This invention relates to the extraction of the juice and pulp from lemons and the like, an operation usually performed manually. The general practice in the past has been to cut the lemons laterally into halves by hand. Machines however, have also been proposed to cut the said lemons. The two halves of the lemon are squeezed by the hands to force as much of the juice and pulp as possible from the peel of the fruit. The fingers are sometimes injured by the knife when the lemons are being cut and the juice of the fruit cracks and chaps the hands, the practice of manually squeezing the fruit being therefore, both unhealthy and insanitary. Machines have hitherto been proposed to extract the juice from the fruit but these have generally been slow in operation and incapable of treating large quantities of fruit expeditiously. In consequence, the manual operation of squeezing still obtains in factories.

The object of this invention is to provide a machine which will remove both the juice and the pulp from lemons and the like in an expeditious manner without contact with the operator after the fruit has been fed in its natural condition to the machine.

Referring to the drawings which form part of this specification:—

Figure 1 is a perspective view of the machine, a driving pulley and a number of lemon cups being removed and portions broken away for convenience of illustration. Fig. 2 is a perspective view looking at the bottom of the machine, portions being broken away and omitted for convenience of illustration. Fig. 3 is a perspective view looking at the machine from the opposite side to that seen in Fig. 1, portions are removed and portions broken away for convenience of illustration. Fig. 4 is a part sectional view of a lemon juice and pulp receptacle showing rotary extractors therein. The lower ends of segmental pathways are also seen the extractors projecting through holes or passageways in said pathways as they do when in operative engagement with the halves of a lemon. Fig. 5 is a part sectional view showing a plunger rod and plunger carrying a lemon cup. Fig. 6 is a sectional view of a lemon cup, taken on line A—A Fig. 5, looking in the direction of the arrow.

The invention includes a driving pulley 2 mounted upon a first motion shaft 3 disposed in a suitable framework 4. Mounted upon the shaft 3 is an eccentric 5 having an eccentric strap 6 attached to which is the upper end of a connecting rod 7 the lower end of which is pivotally connected to a rising and falling frame 8. This may, if desired, move in suitable guideways provided in the framework. As such guideways are not generally necessary they have not been shown in the drawings. Mounted upon the frame 8 is a pulp and juice receptacle 9 provided with suitable outlets or drains 10 provided with removable plugs or the like.

Within the receptacle 9, at each end and secured to the bottom thereof, is a cone shaped bush 11 (Fig. 4). Passing through each bush 11 is the upper end of a spindle 12 carrying a rotary extractor. This is disposed within the receptacle 9 upon the bush 11 and consists of a dome or other shaped head 13 which may be provided with a series of suitable ribs. Secured to the lower end of each spindle 12, below the receptacle, is a minor sprocket wheel 14. Projecting from the rising and falling frame 8, below the receptacle 9 and near each end thereof, is an arm 15 having a slot therein indicated at 16. Adjustably mounted in the slot 16 of each arm 15 is the reduced end of a spindle 17 secured in any desired position by means of a nut or the like. Mounted on the lower end of each spindle 17 is a tension sprocket 18. Passing around the minor sprocket wheels 14 of the rotary extractors and also around the tension sprockets 18 is a sprocket chain 19 which is driven by a major sprocket wheel 20 centrally disposed below the rising and falling frame 8 and carried thereby. The sprocket wheel 20 is provided with a central square hole. Passing through the square hole of the major sprocket wheel 20 is the square lower end 21 of a second motion shaft 22 supported in suitable bearings carried by the framework 4. Instead of sprocket wheels and a chain, toothed gearing or any other suitable drive may be employed. Secured to the upper end of the shaft 22 is a bevel pinion 23 engaging a bevel wheel 24 mounted upon the first motion shaft 3.

Secured to the first motion shaft 3 is a crank arm 25 from which protrudes a crank pin 26 pivoted to which is the upper end of an upper connecting rod 27. The lower end of the rod 27 is pivoted to a pin 28 projecting from the short arm of a first crank lever 29 the long arm of which lever is provided with a catch 30 of square cross section. The crank lever 29 is pivoted to a pivot pin 31 protruding from a first loose disk 32 loosely mounted upon a third motion shaft 33, mounted in suitable bearings carried by the framework 4. Protruding from the first loose disk 32 are limit stops 34. These adjoin the first crank lever 29 and limit the movement thereof. Protruding from the disk, or one of the limit stops 34, is also a suitable spring 35 engaging the long arm of the said crank lever 29. The catch 30 of the crank lever 29 engages in catch recesses 36 formed in the periphery of a first fast disk 37. The recesses are square in conformation and the disk is secured to the third motion shaft 33.

Pivoted to a pivot pin 38 projecting from the first loose disk 32 is the first end of a lower connecting rod 39, the second end of which is pivoted to a pin 40 protruding from the short arm of a second crank lever 41 the long arm of which is provided with a catch 42 of square cross section. The second crank lever 41 is pivoted to a pivot pin 43 protruding from a second loose disk 44 loosely mounted upon a fourth motion shaft 45 which is mounted in suitable bearings carried by the framework 4. Protruding from the disk 44, adjacent the second crank lever 41, are limit stops 46. Protruding from the second loose disk 44, or of one of the stops 46, is also a spring 47 engaging the long arm of the crank lever 41. The catch 42 of the lever 41 engages in catch recesses 48 formed in the periphery of a second fast disk 49 which is secured to the fourth motion shaft 45.

Mounted upon the third motion shaft 33 is a first plunger carrier 50 adjoining which is a cam pathway 51. This is carried by the framework 4. Mounted upon the fourth motion shaft 45 is a second plunger carrier 52. Formed in the periphery of each of the carriers 50 and 52 is a series of holes indicated at 53. Each carrier is provided with a series of radial guideways 54 corresponding with the holes 53. Formed in each guideway is a slotway indicated at 55.

Within each guideway is a helical spring 56 encircling a plunger rod 57 (Fig. 5) from which protrudes a pin and limit stop 58. This moves in and projects through the slotway 55 of its guideway 54. Mounted upon the pins 58 of the first plunger carrier 50 are rollers 59 for engagement with the cam pathway 51. Projecting beyond each guideway 54 of each carrier, and carried by the plunger rod 57 within the said guideway, is a plunger head 60. Secured to and removable from each plunger head 60 is a lemon cup. Each lemon cup consists of a threaded shank 61 (Fig. 5) integral with a head piece 62 having a concave portion 63, provided with a lateral groove 64. Carried by the head piece 62 is a series of pivot pins 65. Pivoted to each pivot pin 65 is the inner end of a jaw 66 the outer end of which is free and may be incut or curved as at $66^a$. Formed between the jaws is a series of openings indicated at 67. Secured to the head piece and bearing against each jaw is a plate spring 68. The shanks 61 of the lemon cups are threaded into the plunger heads 60. Instead of a lemon cup comprising a series of spring controlled pivoted jaws, a plain cup may be used having opposite openings therein to pass ejecting fingers hereinafter described and to provide more or less spring in the cup. Or any other suitable form of cup may be used.

Carried by the framework, between the plunger carriers 50 and 52, is a knife 69. This may be secured to the framework in any suitable manner and is preferably removable therefrom. It may slide into position. Passing downwardly from the knife 69 are two segmental retaining pathways 70, one passing beneath each plunger carrier. The pathways may be integral with the framework 4 or secured thereto. Preferably they are of channel cross section and provided with sides as shown. Formed in each pathway 70, at the lower end thereof, below the third and fourth motion shafts respectively, is a hole or passageway indicated at 71 (Fig. 4). Adjoining each pathway 70 adjacent each plunger carrier is an ejecting finger 72. This may be integral with or secured to the framework 4 and is of such an area that it freely passes through openings 67 between the jaws 66 of the lemon cups.

With this invention motion is transmitted to the first motion shaft 3 by the driving pulley 2. The said shaft communicates an intermittent motion by the crank arm 25, upper connecting rod 27, crank lever 29 and first fast disk 37 to the third motion shaft 33. By the lower connecting rod 39, second crank lever 41 and second fast disk 49 a synchronous intermittent motion is communicated to the fourth motion shaft 45. It is obvious that the varying positions of the connecting rods cause the crank levers to pivot upon their pivot pins, thus engaging the catches of the said levers with the recesses 36, 48 of the fast disks 37, 49 and partially rotating the same. The catches are similarly disengaged from the recesses and return with the loose disks 32 and 44 to initial position. During the return movement the shafts 33, 45 are stationary. The first and second plunger carriers 50 and 52 being mounted upon the shafts 33, 45 are rotated intermittently toward each other. As the first carrier 50 rotates, an operator standing at one side of the machine, places a lemon in each cup of the said carrier as it moves to him. As the said carrier 50 rotates, the rollers 59 of each of its plunger heads 60 engage the cam pathway 51 in succession. Each plunger when it engages the cam pathway 51 is drawn inwardly thereby compressing its helical spring 56. When a plunger is about to leave the cam pathway a cup of the second carrier 52 is opposite the cup carried by the first carrier 50 which cup, by its spiral spring 56, is then when the plunger roller 59 leaves the cam pathway 51, projected toward the opposite cup of the second plunger carrier 52. The lemon carried by the cup of the first carrier 50 enters into the cup of the second carrier 52 also the spring 56 of the cup of the second carrier acting as a buffer and preventing damage to the fruit. As the lemon is projected toward the second carrier movement of the carriers (being intermittent) ceases temporarily thereby permitting the springs 56 of the cups carrying the lemon to centralize or allow the said lemon to properly accommodate itself in the cup of the second carrier 52 regardless of the size of the lemon. The pivoted spring controlled jaws of the lemon cups open or close according to circumstances. The catches 30 and 42 are now reëngaged with catch recesses 36 and 48 and the motion of the carriers continues and the cups move downwardly. The lemon carried by the cups immediately encounters the knife 69 situated between the carriers 50 and 52 and is severed into two pieces. The cup of each carrier now contains one half of a lemon. The flat surfaces of the halves of the lemon, as the carriers proceed, are in contact with the pathways 70 below the said carriers and remain wholly in contact therewith until the hole 71 at the lower end of each pathway is encountered. As the first motion shaft 3 rotates the eccentric 5 thereon causes the frame 8 to rise and fall. As the frame moves vertically the major and minor sprocket wheels 14 and 20 also rise and fall therewith, the major sprocket wheel 20 sliding upon the lower end 21 of the second motion shaft 22. The second motion shaft 22 being rotated by the first motion shaft 3 rotates, by the sprocket chain 19, the rotary extractors within the receptacle 9. As the frame rises the heads 13 of these extractors pass through the holes 71 in the pathways 70 at the moment when a cup carrying half of a lemon is disposed above each of the said holes 71.
The carriers 50, 52 are now stationary. The extractors enter upwardly into the half lemon and by their rotary motion squeeze the juice and pulp therefrom. This falls into the receptacle 9. The frame 8 and extractors then fall and the carriers 50 and 52 proceed. As the carriers proceed the ejecting fingers 72 pass into the opening 67 between two of the jaws 66 of each cup thereby ejecting the lemon peel therefrom. This may fall into any suitable box or receptacle or chutes may be provided to guide it thereto.

The lemon cups are provided with the pivoted spring controlled jaws 66 to accommodate lemons varying in size. It will be seen that upon a lemon being placed in a cup the end of the said lemon bears against the concave portion 63 within the cup, the lower ends of the jaws 66 gripping the lemon under the influence of the spring 68. The class of lemon cup used may vary, however. It should also be mentioned that the holes 53 in the peripheries of the carriers 50 and 52 are, in practice, made larger than the plunger heads 60 which pass through the said holes. The object of providing a "loose fit" for plunger heads 60 is to accommodate fruit the peel of which differs or varies in thickness. Thus, should a rotary extractor pass upwardly into half of a lemon the peel of which was not regular in thickness the cup may move laterally under the influence of the extractor which does not, therefore, damage the peel internally.

It will be obvious that with comparatively slight modification, the third and fourth motion shafts could be continuously rotated instead of being provided with an intermittent movement. It will also be apparent that carriers 50 and 52 may be situated at each end of the said shafts or duplicated; or that the pairs of carriers may be multiplied to any number, each pair having its own juice receptacle, or one large receptacle being employed for all of the said carriers. The knife also could be provided with a reciprocatory movement. Further, the machine could be operated in a horizontal position instead of vertically, all such arrangements being considered within the ambit or scope of the invention which is not restricted to use with lemons but may be employed with equal advantage with oranges and other fruits and also vegetables. Wherever the word "lemon" is used, either in the description or the appended claims, it is to be considered as a descriptive term which includes oranges and any other fruit or vegetables to which the invention may be applied.

Having now described my invention what I claim as new and desire to secure by Letters Patent is:—

1. An improved machine for extracting the juice and pulp from lemons and the like, consisting in a pulp and juice receptacle, of extractors within said receptacle, means for rotating said extractors, a knife, a series of lemon cups carrying the fruit, means for moving the fruit in said cups against said knife, said means delivering the cut fruit in the cups to the extractors, and means for ejecting the peel of the fruit from said cups after treatment by the extractors.

2. An improved machine for extracting the juice and pulp from lemons and the like, consisting in a pulp and juice receptacle, extractors mounted therein, means for rotating said extractors, means for raising and lowering the receptacle, a knife above said receptacle, segmental pathways passing from the knife above the extractors, carriers disposed at each side of the knife, spring controlled lemon cups carried by the carriers, and means for operating the carriers.

3. An improved machine for extracting the juice and pulp from lemons and the like, consisting in two carriers intermittently moving toward each other, lemon cups carried by each carrier, means for centralizing the fruit between a cup of each carrier, means for cutting each lemon into two pieces, means for extracting the juice and pulp from each piece, means for collecting the juice passing from the fruit during and after cutting, the collecting means passing from the cutting to the extracting means, means for preventing damage to the peel during extraction of the juice and pulp owing to variations in the thickness of said peel, and means for ejecting the peel from the lemon cups.

4. An improved machine for extracting the juice and pulp from lemons and the like, consisting in two plunger carriers, spring controlled plungers carried by said carriers, means for reciprocating the plungers of one of said carriers, a lemon cup carried by each plunger of each carrier, means for imparting an intermittent motion to the carriers, a knife disposed between the carriers, segmental pathways passing from said knife, a pulp and juice receptacle below the pathways and the carriers, rotary extractors mounted in the receptacle, means for rotating the extractors and means for elevating and lowering the receptacle and extractors therein to and from the pathways.

5. In an improved machine for extracting the juice and pulp from lemons and the like, two lemon cups one of which carries a lemon, means for accommodating different sizes of lemons in the cups, means for moving said cups toward each other, means for centralizing the lemon between the two cups, means for cutting the lemon into two pieces one of which is retained by each cup, and means entering into each piece of the lemon to extract the juice and pulp therefrom.

6. In an improved machine for extracting the juice and pulp from lemons and the like, two intermittently moving lemon cups one of which carries a lemon, said cups moving toward each other, each cup comprising a series of spring controlled pivoted jaws, springs for centralizing the lemon between the two cups, means for cutting the lemon into two pieces one of which is retained by each cup, each cup being capable of lateral movement, rotary extractors, and means for entering said extractors into the piece of lemon carried by each cup.

7. An improved machine for extracting the juice and pulp from lemons and the like, consisting in a framework, plunger carriers mounted in said framework, means for imparting an intermittent movement to the carriers, plungers carried by each carrier, springs controlling the plungers, a lemon cup carried by each plunger, a cam pathway adjoining one of the carriers and operating the plungers thereof, a knife disposed between the carriers, segmental pathways passing from the said knife, a juice and pulp receptacle below the carriers and the pathways, rotary extractors mounted in the receptacle, means for rotating said extractors and means for elevating and lowering the receptacle.

8. An improved machine for extracting the juice and pulp from lemons and the like, consisting in a pulp and juice receptacle, a coned bush carried at each end of said receptacle, a rotary extractor above each bush, means for rotating said extractors, a first motion shaft, an eccentric thereon for elevating and lowering the receptacle, a knife above the receptacle, segmental pathways passing from said knife to a position above the extractors, each pathway having therein a hole to pass the extractor below it, a plunger carrier above each extractor, means for intermittently moving the carriers, a series of spring controlled plungers within each carrier, a cam pathway adjoining one of the carriers and operating the plungers therein, a lemon cup carried by each plunger each cup consisting of a series of spring controlled pivoted jaws and ejecting fingers passing between the jaws of the lemon cups.

9. In an improved machine for extracting the juice and pulp from lemons and the like, a lemon cup comprising a head piece having a concave portion, jaws pivoted to said head piece and plate springs secured to the head piece and bearing against the jaws.

10. An improved machine for extracting the juice and pulp from lemons and the like, consisting in a framework, a rising and falling frame mounted therein, means for operating said frame, a pulp and juice receptacle carried by said frame, a coned bush within the receptacle at each end thereof, a rotary extractor bearing upon each bush, a crank arm, two pivoted crank levers operated by said arm, a loose disk carrying each crank lever, a motion shaft carrying each loose disk, a fast disk secured to each shaft and operated by the corresponding crank lever, a plunger carrier mounted upon each shaft, a series of spring controlled plungers mounted in each carrier, a cup carried by each plunger, a cam pathway adjoining one of the carriers and operating the plungers thereof, a knife disposed between the carriers, segmental pathways passing from the knife below each carrier and above each extractor, and an ejecting finger adjoining each extractor.

11. In a machine for extracting juice and pulp from lemons and the like, the combination of a knife, movable lemon cups disposed at opposite sides of the knife and adapted to coöperate to present the lemons to the knife.

12. In a machine for extracting juice and pulp from lemons and the like, the combination of a knife, movable lemon cups disposed at opposite sides of the knife and adapted to coöperate to present lemons to the knife, and extractors arranged to operate upon the portions of the lemons held in the cups.

13. In a machine for extracting juice and pulp from lemons and the like, the combination of a knife, movable lemon cups disposed at opposite sides of the knife and adapted to coöperate to present lemons to the knife, extractors arranged to operate upon the portions of the lemons held in the cups, means for catching the extracted juices, and means for ejecting the lemon peel from the cups.

14. In a machine for extracting juice and pulp from lemons and the like, two oppositely moving lemon cups coincident for a portion of their travel and adapted to hold a lemon between them at the point of coincidence, and means for cutting the lemon while so held by the cups.

15. In a machine for extracting juice and pulp from lemons and the like, two oppositely moving lemon cups coincident for a portion of their travel and adapted to hold a lemon between them at the point of coincidence, and means for cutting the lemon while so held by the cups; with means for extracting the juice and pulp from the lemon halves while held by the cups, and means for thereafter ejecting the peels from the cups.

16. In a machine for extracting juice and pulp from lemons and the like, the combination of a knife, rotary carriers disposed at opposite sides of the knife, and lemon cups carried by the carriers and adapted to coöperate to present lemons to the knife.

17. In a machine for extracting juice and pulp from lemons and the like, the combination of a knife, rotary carriers disposed at opposite sides of the knife, lemon cups carried by the carriers and adapted to coöperate to present lemons to the knife, and extractors arranged to operate upon the portions of the lemons held in the cups.

18. In a machine for extracting juice and pulp from lemons and the like, the combination of a knife, rotary carriers disposed at opposite sides of the knife, lemon cups carried by the carriers and adapted to coöperate to present lemons to the knife, extractors arranged to operate upon the portions of the lemons held in the cups, and means for ejecting the lemon peel from the cup.

In testimony whereof I have hereunto affixed my signature in the presence of two subscribing witnesses.

RICHARD THOMAS PARK.

Witnesses:
 CECIL McPLASTNER,
 GEORGE A. U'REN.